J. LEDWINKA.
LID OR COVER SUPPORT.
APPLICATION FILED FEB. 28, 1916.
1,264,310.   Patented Apr. 30, 1918.
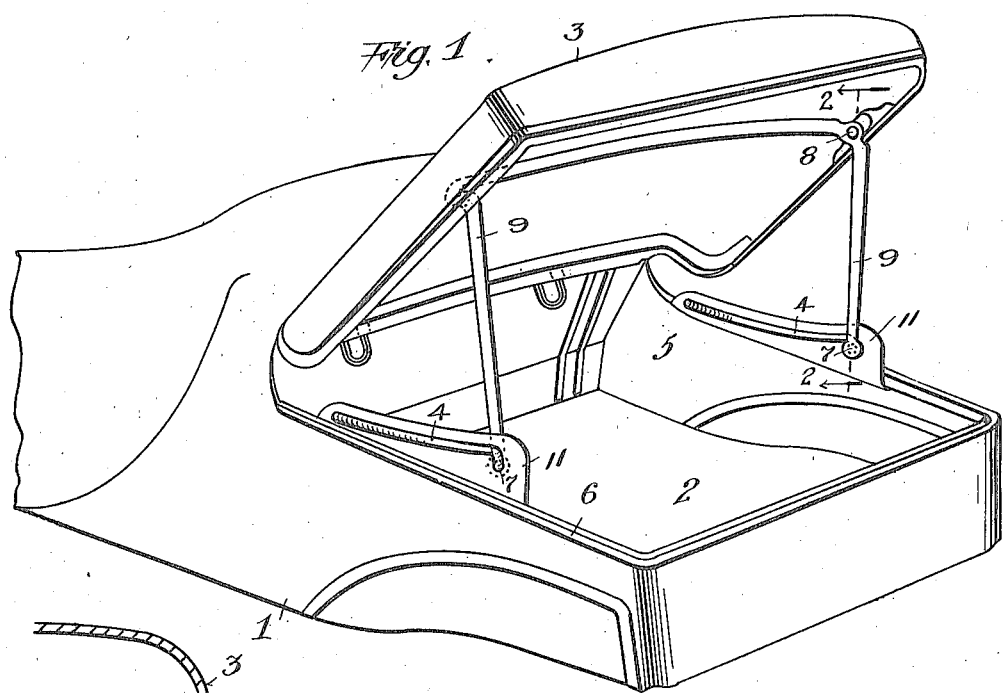
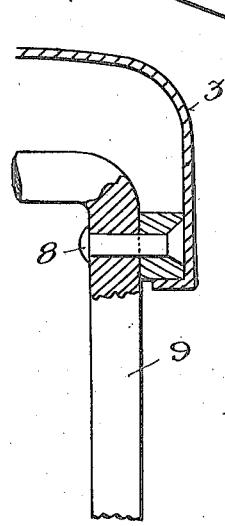
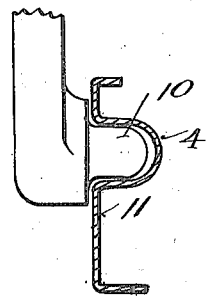
Inventor
Joseph Ledwinka
By his Attorney
Samuel G. Darby

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, A CORPORATION OF PENNSYLVANIA.

LID OR COVER SUPPORT.

1,264,310. Specification of Letters Patent. Patented Apr. 30, 1918.

Application filed February 28, 1916. Serial No. 80,946.

*To all whom it may concern:*

Be it known that I, JOSEPH LEDWINKA, a citizen of the United States, residing at Philadelphia, county of Philadelphia, State of Pennsylvania, have made a certain new and useful Invention in Lid or Cover Support, of which the following is a specification.

This invention relates to a lid or cover support.

The object of the invention is to provide a lid or cover support which is simple in structure and economical of manufacture, and which is particularly adapted for use in connection with certain types of automobile bodies.

Further objects of the invention will appear more fully hereinafter.

The invention consists substantially in the construction, combination, location and relative arrangement of parts, all as will be more fully hereinafter set forth, as shown by the accompanying drawing, and finally pointed out in the appended claims.

Referring to the drawing,—

Figure 1 is a view in perspective of the compartment or rear portion of an automobile body, showing a lid or cover support, embodying my invention.

Fig. 2 is a sectional view taken on the line 2, 2, Fig. 1, and looking in the direction of the arrows.

The same part is designated by the same reference numeral wherever it occurs throughout the several views.

Although I am not to be limited to any specific use of my invention, in the drawing I show my invention as applied to the rear or compartment portion of the usual roadster or runabout type of automobile body wherein 1 designates the rear portion of the vehicle body which is provided with the compartment 2 formed therein, and the lid or cover 3, hinged or otherwise secured at its front end to the vehicle body and adapted to be raised as shown in Fig. 1. Each side 5 and 6 is provided with an upwardly extending portion 11 which in turn is provided with a horizontally extending groove or channel pressed therein as indicated at 4, which groove terminates at its rear end with a downwardly extending portion at 7. Pivoted to the respective side walls of the lid or cover 3, by any suitable means, for example, by the pin 8, is a U-shaped rod or member 9, preferably made of suitable metal, forged in the form shown, the respective legs of which are provided with outwardly faced lugs 10, adapted to fit and slide in the grooves or channels 4, as is clearly shown.

Assuming the parts to be in the position shown in Fig. 1, to close the lid or cover 3, forward pressure is exerted on either of the legs of the U-shaped member 9, which causes the lugs 10 to slide or be pushed out of the depressed portions 7 of the grooves 4 of both of the side portions 11, as the U-shaped member 9 is formed of one piece. The lid or cover 3 is then lowered to its full closed position in the usual manner. To open the lid or cover, the same is raised, the raising movement causing the lugs 10 of the legs of the U-shaped member to travel in the grooves 4 until they fall in the depressed portions 7 thereof.

From the foregoing, it will be seen that I provide a simple, efficient lid support of but few parts, and exceptionally economical to manufacture, and in which, due to the structure and arrangement thereof, twisting strain upon the lid or cover 3 is entirely eliminated, thereby preventing the lid or cover, which is usually constructed of rather thin and more or less pliable sheet metal stampings, from becoming twisted or warped due to strain imposed upon one side thereon in opening or closing the same.

Having now set forth the object and nature of my invention, and one structure embodying the principles thereof, what I claim as new and useful, and of my own invention, and desire to secure by Letters Patent, is,—

1. The combination with a compartment and a lid or cover hinged at one edge thereto, said compartment having side portions each having a longitudinally extending depression pressed into the inner face thereof, of a lid or cover supporting member hinged to the under face of the lid or cover and extending transversely across the same and having laterally extending portions at the free ends thereof to be received and slide in said depressions.

2. The combination with a compartment and a lid or cover hinged at one edge thereto, said compartment having side portions formed with horizontally extending depressions in the opposed faces thereof, said depressions formed with downwardly extending portions at their rearward extremities, of a U-shaped member extending transversely across and pivotally connected to the free edge of said lid or cover, the legs of said U-shaped member having projecting lugs at their ends to engage and slide in said depressions.

3. A vehicle body having a compartment, said compartment having channels pressed in the opposed faces of the side portions thereof, a lid or cover for the compartment, a U-shaped member extending transversely across the lid or cover, and having its legs constructed to engage in said channels.

In testimony whereof I have hereunto set my hand in the presence of the subscribing witnesses, on this 15th day of February, A. D. 1916.

JOSEPH LEDWINKA.

Witnesses:
 EDWIN B. H. TOWER, Jr.,
 SAMUEL E. DARBY.